United States Patent
Biessener et al.

(10) Patent No.: US 6,345,346 B1
(45) Date of Patent: Feb. 5, 2002

(54) SUBSTANTIALLY INSTANTANEOUS STORAGE RESTORATION FOR NON-COMPUTER FORENSICS APPLICATIONS

(75) Inventors: David W. Biessener, Woodbury, MN (US); Joseph A. Frolik, Osceola, WI (US); Gaston R. Biessener, St. Paul, MN (US)

(73) Assignee: Voom Technologies, Lakeland, MN (US)

( * ) Notice: Subject to any disclaimer, the term of this patent is extended or adjusted under 35 U.S.C. 154(b) by 0 days.

(21) Appl. No.: 09/258,413

(22) Filed: Feb. 26, 1999

(51) Int. Cl.[7] ............................................. G06F 12/00
(52) U.S. Cl. ..................... 711/162; 711/112; 711/162; 711/166; 711/170; 395/182; 714/4
(58) Field of Search ................. 711/112, 162, 711/170, 166; 395/182.04; 714/7

(56) References Cited

U.S. PATENT DOCUMENTS

| | | | |
|---|---|---|---|
| 4,819,154 A | | 4/1989 | Stiffler et al. |
| 4,959,774 A | | 9/1990 | Davis |
| 5,212,784 A | | 5/1993 | Sparks |
| 5,269,022 A | | 12/1993 | Shinjo et al. |
| 5,357,509 A | * | 10/1994 | Ohizumi ........................ 714/7 |
| 5,469,573 A | * | 11/1995 | McGill, III et al. ............ 714/7 |
| 5,487,160 A | | 1/1996 | Bemis |
| 5,572,659 A | | 11/1996 | Iwasa et al. |
| 5,724,501 A | * | 3/1998 | Dewey et al. .................. 714/9 |
| 5,740,397 A | | 4/1998 | Levy |
| 5,742,792 A | * | 4/1998 | Yanai et al. ................. 711/162 |
| 5,758,057 A | * | 5/1998 | Baba et al. ..................... 714/7 |
| 5,777,874 A | | 7/1998 | Flood et al.. |
| 5,799,141 A | | 8/1998 | Galipeau et al. |
| 5,829,045 A | * | 10/1998 | Motoyama ................... 711/162 |
| 6,044,444 A | * | 3/2000 | Ofek ........................... 711/162 |

OTHER PUBLICATIONS

Www.tigerdirect.com; Catalog Excerpt, Date Unknown, p. 92XKD; Showing Goback Utilities Software.

* cited by examiner

*Primary Examiner*—Do Hyun Yoo
*Assistant Examiner*—Mehdi Namazi
(74) *Attorney, Agent, or Firm*—Shumaker & Sieffert, P.A.

(57) ABSTRACT

Restoration of a storage for a computer, such as a hard disk drive, is provided. In one embodiment, a system includes a host device such as a processor or computer, a connection point at the host device such as a communications bus, a primary storage and a secondary storage. The primary storage has stored thereon first data, and sends this data to the host device in response to receiving a corresponding read command at the connection point. The secondary storage stores second data in response to receiving a write command including this data at the connection point, and sends the second data in response to receiving a corresponding read command at the connection point.

5 Claims, 4 Drawing Sheets

SUBSTANTIALLY INSTANTANEOUS STORAGE RESTORATION FOR NON-COMPUTER FORENSICS APPLICATIONS

FIELD OF THE INVENTION

This invention relates generally to the restoration of a storage device such as a hard disk drive to a previous state, and more particularly to such restoration that is substantially instantaneous.

BACKGROUND OF THE INVENTION

The restoration of a storage device for a computer, such as a hard disk drive, to a previous state is critical in many situations. For example, in enterprise computing situations, testing whether installation of new software to a hard disk drive is compatible with the rest of the system means that frequently the hard disk drive must be restored to a state previous to when the installation of the new software was performed, if bugs or problems are encountered after the software has been installed. This situation also presents itself in other environments, such as the personal computer context: for example, a user installing a new version of an operating system to his or her hard disk drive may find that the operating system does not function as advertised, such that the user desires to restore the disk drive to the previous operating system.

In situations such as these, the process for restoration is generally similar. First, a back-up of the storage device is made to another storage device, such as a hard disk drive. The new software is then installed, and the system booted and tested. When a problem arises such that restoration is required, the back-up previously made is copied back to the hard drive. However, this is a less than optimal solution: backing up and restoration of a storage device can take hours in the case of a personal computer, and in enterprise contexts can literally take days if there is enough information that needs to be backed up or restored. Thus, the testing process of new software installations becomes needlessly time intensive.

For these and other reasons, there is a need for the present invention.

SUMMARY OF THE INVENTION

The invention relates generally to the restoration of a storage device such as a hard disk drive of a computer to a previous state. In one embodiment, a system includes a host device such as a processor or computer, a connection point at the host device such as a communications bus, a primary storage and a secondary storage. The primary storage has stored thereon first data, and sends this data to the host device in response to receiving a corresponding read command at the connection point. The secondary storage stores second data in response to receiving a write command including this data at the connection point, and sends the second data in response to receiving a corresponding read command at the connection point.

Thus, in at least some embodiments, a first state can be defined as the first data already on the primary storage. Subsequent (second) data sent to the connection point by the host device is written to the secondary storage. Read commands from the host device are handled either by the primary or the secondary storage, depending on whether the command relates to the first data stored on the primary storage, or the second data stored on the secondary storage. Optimally, in at least some embodiments, this process is transparent to the host device.

In another embodiment, first data can be copied to the secondary storage and their roles (as the primary,l and the secondary storage) reverse. Furthermore, in some embodiments, near instantaneous reconciliation can be achieved by updating the secondary storage during free bus cycles, as is described in the detailed description.

Therefore, when restoration is required to the first state, in at least some embodiments the system also includes a switch—hardware or software—that instantly restores the secondary storage to an initial state prior to which the second data was stored thereon. This means that restoration to the first state is performed substantially instantaneously—the primary storage still has stored thereon the first data, and the secondary storage stores anew.

Furthermore, when a new "first state" is desired—such that this new state includes both the first data stored on the primary storage and the second data stored on the secondary storage then another switch of the system (in at least some embodiments) is included that copies the second data from the secondary storage to the primary storage, and the secondary storage is again restored to an initial state prior to which the second data was stored thereon. Thus, any new, third data sent by the host device is now stored on the secondary storage, such that restoration to the "first state" means restoration to the state where the primary storage has first and second data stored thereon.

It is noted that this application is limited to non-computer forensics applications only. Computer forensics applications are not encompassed in the scope of this patent application. As used herein, the phrase computer forensics refers to the application of computer investigation and analysis techniques in the interests of determining potential legal evidence. For example, computer data may be the evidence of a crime.

Different embodiments of the invention include systems, devices, and methods of varying scope. Other aspects, advantages and embodiments of the invention will become apparent by reference to the included drawings, and by reading the following detailed description.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

General System

Figure 1:
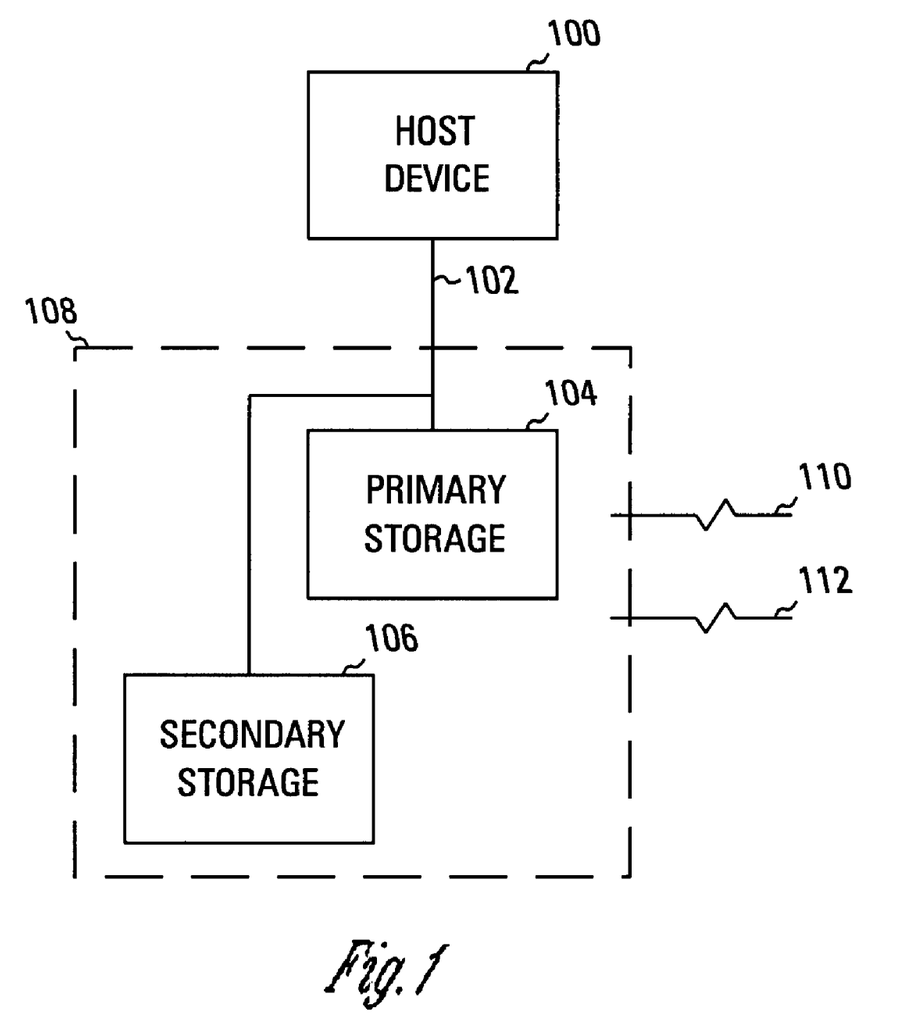
FIG. 1 shows a diagram of a system according to an embodiment of the invention.

Referring first to FIG. 1, a system according to an embodiment of the invention is shown. The system includes a host device 100, a connection point 102, a primary storage 104, and a secondary storage 106. The host device can be a computer, or one or more components thereof, such as a processor. The connection point 102 is the manner by which the host device 100 is connected to the primary storage 104 and the secondary storage 106—that is, it operatively couples the host device 100 to each of the primary storage 104 and the secondary storage 106. In one embodiment, it includes a bus, such as an IDE or SCSI bus as known in the art. The invention is not so particularly limited, however. The storage 104 and the storage 106 can in one embodiment have a connector (between the two of them) for connection to the connection point 102, such as an IDE or a SCSI cable connector.

Each of the primary storage 104 and the secondary storage 106 can be any type of one or more storage devices, such as a hard disk drive or other fixed storage device, a removable media drive, etc. The invention is not so limited. As indicated by the dotted-line box 108 surrounding the storage 104 and the storage 106, the storages 104 and 106 can in one embodiment act as a single physical storage device as seen by the host device 100. For example, normally a single hard drive may be connected to the host device 100 via the connection point 102; under an embodiment of the invention, conversely, the storages 104 and 106 may be connected to the host device 100 via the connection point 102, as disposed in the same case, such that to the host device 100, the storages 104 and 106 appear as a single device. Thus, the diagram of FIG. 1 shows a logical view of the storages, and does not necessarily represent an actual physical view of the storages.

An initial state of the primary storage 104 and the secondary storage 106 is defined as the primary storage 104 having first data already written thereon, and the secondary storage 106 having no data written thereon. Subsequent to this initial state, the embodiment of FIG. 1 works as follows. When the host device 100 sends (second) data to the connection point 102 for writing on the device connected to the connection point 102 it sees as box 108 (for example, by sending an appropriate and corresponding write command including this second data, as known in the art), the secondary storage 106 actually stores the second data—not the primary storage 104. Thus, subsequent to the initial state, all writing of data by the host device 100 through the connection point 102 is performed by the secondary storage 106.

When a read command is received over the connection point 102 for a particular piece of data, from the host device 100, the primary storage 104 responds if the read command relates to any of the first data that it has stored thereon—that is, it responds by sending this data to the host device 100 over the connection point 102. Conversely, when a read command is received that relates to any of the second data that the secondary storage 104 has stored thereon, then it responds, by sending the asked-for data to the host device 100 over the connection point 102. Subsequent to the initial state, then, three situations are possible:

(1) If a write command is received at the connection point 102, the secondary storage 106 stores the data included therein;

(2) If a read command is received at the connection point 102 that relates to the (first) data stored on the primary storage 104, then the storage 104 responds to the command (unless updating of the secondary storage 106 has been occurring during a free bus cycle with this data, as is described later in the detailed description); and, (3) If a read command is received at the connection point 102 that relates to the (second) data stored on the secondary storage 106, then the storage 106 responds to the command.

The system of FIG. 1 provides the invention with advantages not found in the prior art, by inclusion of at least one of a switch 110 and a switch 112, as shown in FIG. 1. Each of the switches 110 and 112 can be hardware or software. A hardware switch, for example, is a switch that is a real, physical switch operatively connected to the storages 104 and 106. A software switch is a virtual switch, implemented by software, that is actuated by issuance of a corresponding command by the host device 100 over the connection point 102. The invention is not limited to a switch of either type, however.

The switch 110, when actuated, instantly restores the secondary storage 106 to a state prior to which the second data was stored thereon. That is, it restores the two of the primary storage 104 and the secondary storage 106 such that the only data stored thereon between the two is the first data stored on the primary storage 104 at the definition of the initial state—the second data stored on the secondary storage 106—deleted or otherwise ignored (i.e., forgotten). This means that restoration of the primary storage 104 and the secondary storage 106 is substantially instantaneous. Rather than restoring the initial state of the primary storage 104 from a previously made back up, as in the prior art (in the case where all second data was written to the primary storage 104), because the second data was stored on a separate storage—the secondary storage 106—the initial state can easily and quickly be restored to by deleting the data on or otherwise resetting the secondary storage 106, on which all new (second) data sent over the connection point 102 since the initial state was stored.

Furthermore, the switch 112, when actuated, resets the initial state of the primary storage 104 and the secondary storage 106 to their current state. This is done in one embodiment by copying the second data as has been stored on the secondary storage 106 to the primary storage 104, establishing a new initial state. The secondary storage 106 is then reset, or the second data thereon is otherwise deleted or forgotten. Thus, the new "first data" on the primary storage 104 is the previous first data and the second data as has been recently copied to the primary storage. The secondary storage 106 is then ready to accept new data as received at the connection point 102 from the host device 100, such that actuation of the switch 110 results in restoration of the primary storage 104 and the secondary storage 106 to the newly established initial state—only including the previous first data and the previous second data, and not any new data that may have been written to the secondary storage 106 in the interim.

Method (software implementation)

Figure 2:
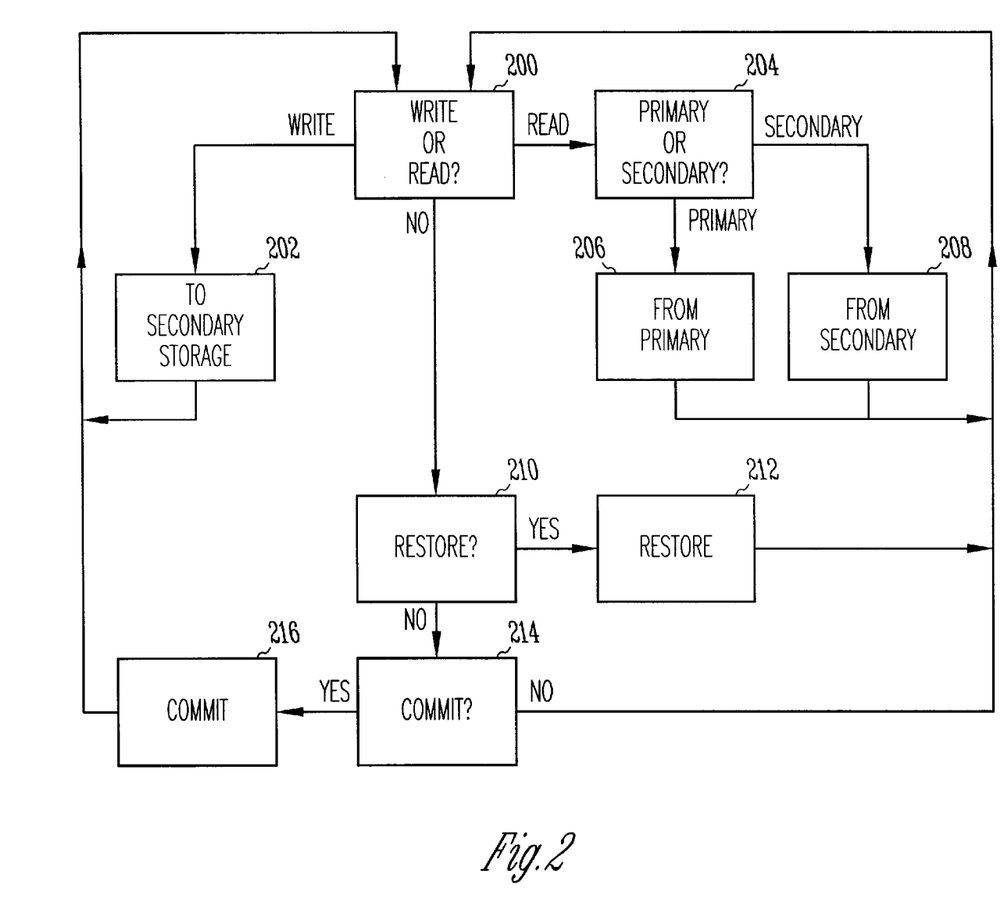
FIG. 2 shows a flowchart of a computer-implemented embedding method according to an embodiment of the invention.

Referring now to FIG. 2, a computer-implemented method according to an embodiment of the invention is shown. This computer-implemented method specifically describes a software implementation of the invention; the invention itself, however, is not so limited to such a software implementation. The computer-implemented method is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer, for example, over the Internet.

The method of FIG. 2 starts with an initial state such that first data is stored on a primary storage, and no data is stored on a secondary storage. Then, in 200, it is determined whether a write or a read command has been received from a host device, at a connection point thereof. If a write command has been received, the method proceeds to 202, and the (second) data that is the subject of the write command is written to the secondary storage; the method then goes back to 200. If a read command is received, the method instead proceeds to 204, and it is determined whether first data is the subject of the read command (as stored on the primary storage), or if second data is the subject of the read command (as stored on the secondary storage). If the former, then in 206 the primary storage responds to the read command, and the data is read from the primary storage for sending to the host device via the connection point. If the latter, then in 208 the secondary storage responds to the read command, and the data is read from the secondary storage for sending to the host device via the connection point. In either case, the method returns to 200.

If instead of a read or write command at 200, a restore or reconcile command is received—either by actuation of a software switch or actuation of a hardware switch—then the method proceeds to 210. If the command is a restore command, then in 212 the primary and the secondary storage are reset to their initial state. That is, the secondary storage is reset or the second data stored thereon is otherwise erased or forgotten, and the only data stored between the primary and the secondary storage is the first data still on the primary storage. The method then returns to 200. If the command is a reconcile command, then the method goes from 214 to 216. In 216, a new initial state is established, by, for example, copying the second data to the primary storage from the secondary storage, and then resetting the (initial state of the) secondary storage or otherwise erasing or forgetting the second data stored thereon. Thus, a subsequent reset command will reset the state of the primary and the secondary storage to the state where the primary storage is storing the first and the second data (that is, the newly established initial state), and any subsequent data is deleted from the secondary storage. The method then proceeds back to 200.

Hardware Implementation

Figure 4:
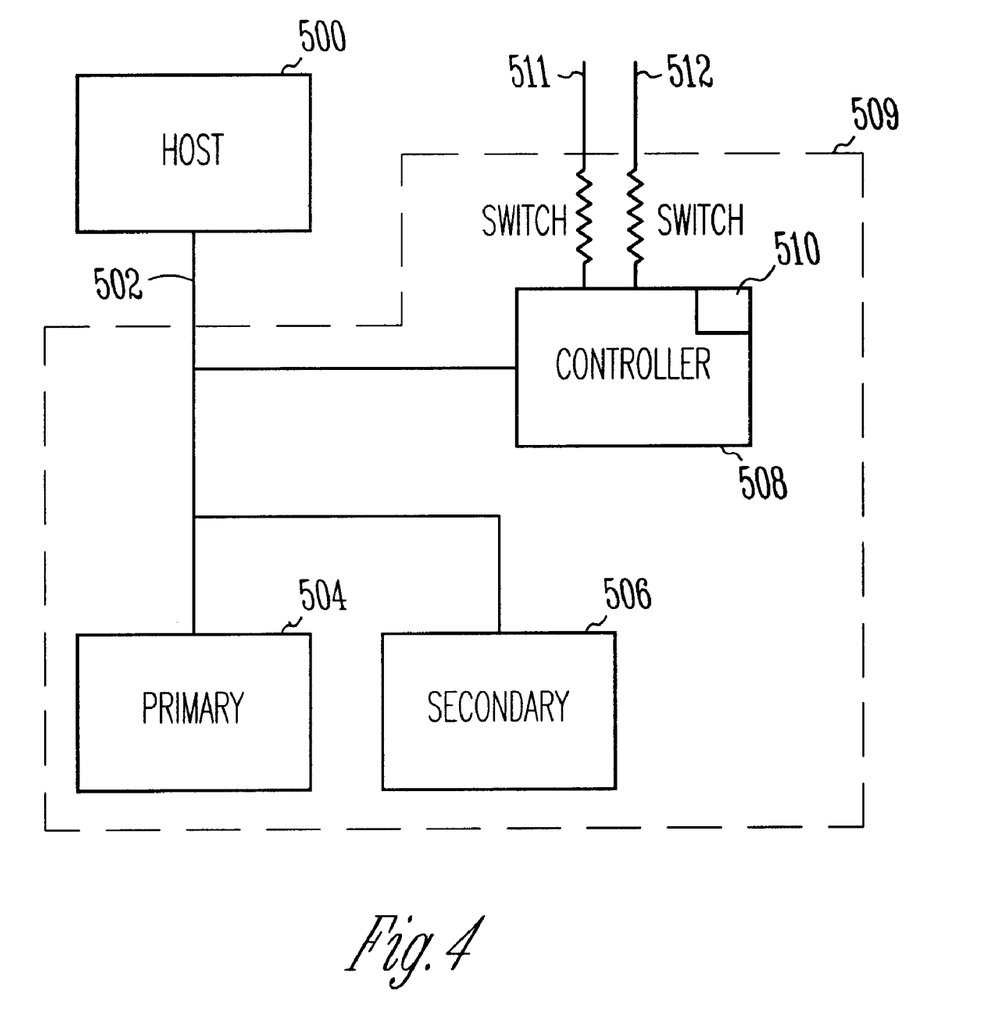
FIG. 4 shows a diagram of a system according to another embodiment of the invention.

In this section of the detailed description, a specific hardware implementation of the invention is described; however, the invention itself is not limited to this hardware implementation. Referring now to FIG. 4, a diagram of a system according to one embodiment of the invention is shown. The system includes a host device 500, a connection point 502, a primary storage 504, a secondary storage 506, and a controller 508. The host device 500 can be a computer, or one or more components thereof, such as a processor. The connection point 502 is the manner by which the host device 500 is connected to the primary storage 504 and the secondary storage 506—that is, it operatively couples the host device 500 to each of the primary storage 504 and the secondary storage 506. In one embodiment, it includes a bus, such as an IDE or SCSI bus as known in the art. The invention is not so particularly limited, however. The storage 504 and the storage 506 can in one embodiment have a connector (between the two of them) for connection to the connection point 502, such as an IDE or a SCSI cable connector.

In particular, the connection point 502 usually connects the host device 500 to the primary storage 504 and the secondary storage 506. However, in the embodiment of FIG. 4, the connection point 502 has been broken such that the controller 508 intercepts commands to the primary storage 504 and the secondary storage 506. The controller 508 is shown as separate from the storages 504 and 506, and in one embodiment, is a hardware controller, although the invention is not so limited. In one particular embodiment, the controller 508, and the storages 504 and 506, can be encased in the same physical device, such that the device itself plugs into the connection point 502. In another particular embodiment, however, the controller 508 is in a separate physical device from the storages 504 and 506.

Each of the primary storage 104 and the secondary storage 106 can be any type of one or more storage devices, such as a hard disk drive or other fixed storage device, a removable media drive, etc. The invention is not so limited. As indicated by the dotted-line box 509 surrounding the controller 508 and the storage 504 and the storage 506, the storages 504 and 506 and the controller 508 can in one embodiment act as a single physical storage device as seen by the host device 500. For example, normally a single hard drive may be connected to the host device 100 via the connection point 502; under an embodiment of the invention, conversely, the storages 504 and 506 and the controller 508 may be connected to the host device 500 via the connection point 502, as disposed in the same case, such that to the host device 500, the storages 504 and 506 and the controller 508 appear as a single device.

The secondary storage 506 is mapped such that it has a corresponding block, sector, or other demarcable unit for every block, sector, or demarcable unit of the primary storage 504 (it may have more, however). This is so that a write command for data to be written to a given block or sector, for example, of the primary storage 504 can instead be written to a corresponding block or sector of the secondary storage 506. It is noted, too, that the physical considerations of the storages 504 and 506 are not an issue under the invention: in fact, the storages 504 and 506 can be part of the same physical storage device, such as a hard drive, can each or one be more than one physical storage device, can be a RAID storage device (as known within the art), etc. Importantly, the diagram of FIG. 4 shows a logical view of an embodiment of the invention, and not necessarily a physical view of the embodiment.

As has been already described, the controller 508 is in one embodiment a hardware controller. The controller 508 includes an in-memory map 510 (e.g., in random-access memory (RAM), synchronous dynamic RAM (SDRAM), etc.; the invention is not so limited, however) that stores a complete index of all writes that have come from the host device 500. In one embodiment, this is accomplished by having a separate bit for every block, sector, cluster, or other demarcable unit of the primary storage 504 (and, correspondingly, for every corresponding block, sector, cluster or other demarcable unit of the secondary storage 506), such that when the bit is turned on (logical one), it indicates that a write has taken place thereto, and when the bit is off (logical zero), it indicates that no write has taken place thereto.

An initial state of the primary storage 504 and the secondary storage 506 is defined as the primary storage 504 having first data already written thereon, and the secondary storage 506 having no data written thereon. The bits of the map 510 corresponding to this first data being stored on blocks, sectors, clusters, or other demarcable units of the primary storage 504, however, are initially off, to indicate that no new data has been written to these blocks, sectors, etc. Subsequent to this initial state, the embodiment of FIG. 4 works as follows. When the host device 500 sends (second) data to the connection point 502 for writing on the device connected to the connection point 502 it sees as box 508 (for example, by sending an appropriate and corresponding write command including this second data, as known in the art), the controller 508 intercepts this command. The controller 508 sets the corresponding bit in the map 510 for the second data of the write commands and sends the data to be written on the secondary storage 506—not the primary storage 504. Thus, the secondary storage 506 actually stores the second data—not the primary storage 504. That is, subsequent to the initial state, all writing of data by the host device 500 through the connection point 502 is performed by the secondary storage 506.

When a read command is received over the connection point 502 for a particular piece of data, from the host device 500, the controller 508 intercepts the command, and has the primary storage 504 respond if the read command relates to any of the first data that it has stored thereon—that is, it responds by sending this data to the host device 500 over the connection point 502. Conversely, when a read command is received that relates to any of the second data that the secondary storage 504 has stored thereon, then the controller 508 has it respond, by sending the asked-for data to the host device 500 over the connection point 502. The controller 508 makes this determination by checking the map 510; if the map 510 has a bit set for the data requested in the read command, then this data is read from the secondary storage 506; otherwise, the data is read from the primary storage 504. Subsequent to the initial state, then, three situations are possible:

(1) If a write command is received at the connection point 502, the secondary storage 506 stores the data included therein;

(2) If a read command is received at the connection point 502 that relates to the (first) data stored on the primary storage 504, then the storage 504 responds to the command (unless updating of the secondary storage 506 has been occurring during a free bus cycle with this data, as is described later in the detailed description); and, (3) If a read command is received at the connection point 502 that relates to the (second) data stored on the secondary storage 506, then the storage 506 responds to the command.

The system of FIG. 1 provides the invention with advantages not found in the prior art, by inclusion of at least one of a switch 511 and a switch 512, as shown in FIG. 4. Each of the switches 511 and 512 can be hardware or software. A hardware switch, for example, is a switch that is a real, physical switch operatively connected to the controller 508. A software switch is a virtual switch, implemented by software, that is actuated by issuance of a corresponding command by the host device 500 over the connection point 502. The invention is not limited to a switch of either type, however. It is noted that a hardware switch, however, provides for faster operation, and negates any security issues that can be present with a software switch, such as a hacker forcing reconciliation and restoration commands to the controller 508 when they are not desired, etc.

The switch 511, when actuated, instantly restores the secondary storage 506 to a state prior to which the second data was stored thereon. This is accomplished simply by erasing the map 510, such that all of the writes that have been performed by the secondary storage 506 are forgotten by the controller 508. That is, the switch 511 restores the two of the primary storage 504 and the secondary storage 506 such that the only data stored thereon between the two is the first data stored on the primary storage 504 at the definition of the initial state—the second data stored on the secondary storage 506 is forgotten. This means that restoration of the primary storage 504 and the secondary storage 506 is substantially instantaneous. Rather than restoring the initial state of the primary storage 504 from a previously made back up, as in the prior art (in the case where all second data was written to the primary storage 504), because the second data was stored on a separate storage—the secondary storage 506—the initial state can easily and quickly be restored to by deleting the data on or otherwise resetting the secondary storage 506, on which all new (second) data sent over the connection point 502 since the initial state was stored.

Furthermore, the switch 512, when actuated, resets the initial state of the primary storage 504 and the secondary storage 506 to their current state. This is done in one embodiment by the controller 508 copying the second data as has been stored on the secondary storage 506 (indicated by turned-on bits in the map 510) to the primary storage 504 (and subsequently turning off the bits in the map 510 as their corresponding block, sectors, etc., of data have been copied from the secondary storage 506 to the primary storage 504), establishing a new initial state. The secondary storage 506 is thus "reset," since the map 510 is completely zeroed (that is, all the bits thereof corresponding to sectors, clusters, etc., are now logical zero). Thus, the new "first data" on the primary storage 504 is the previous first data and the second data as has been recently copied to the primary storage. The secondary storage 506 is then ready to accept new data as received at the connection point 502 from the host device 500, such that actuation of the switch 510 results in restoration of the primary storage 504 and the secondary storage 506 to the newly established initial state—only including the previous first data and the previous second data, and not any new data that may have been written to the secondary storage 506 in the interim.

Other embodiments of the invention are based on the embodiment of FIG. 4, and provide for faster establishing of a new initial state. For example, during free bus cycles of the connection point 502 (or, just "free cycles" in the case where the point 502 is not necessarily a bus)—defined generally as when the host 500 is not sending write or read commands over the point 502, such that the point 502 (e.g., a bus) is "quiet" —the sectors, blocks, clusters, or other demarcable units of the primary storage 504 having the first data stored thereon are copied by the controller 508 to their corresponding sectors, etc., of the secondary storage 506. In conjunction with this copying, bits corresponding to these sectors, etc., within the memory map 510 are turned on to logical one, to indicate that the secondary storage is having this first data copied thereto. Ultimately, if there are sufficient free bus cycles, all of the first data on the primary storage 504 is copied to the secondary storage 506, such that the primary storage 504 has the first data stored thereon, and the secondary storage 506 has the first data and any second data stored thereon.

In this particular embodiment, when the switch 512 is actuated, the controller 508 makes a determination as to the quickest process by which reconciliation can occur. The controller 508 must decide whether copying the second data from the secondary storage 506 to the primary storage 504, to establish a new initial state will be quicker, or whether copying any remaining first data from the primary storage 504 to the secondary storage 506, that has not already been copied to the secondary storage 506, will be quicker. This decision in one embodiment is made simply by comparing the amount of second data that would need to be copied from the secondary storage 506 to the primary storage 504 with the amount of first data that still needs to be copied from the primary storage 504 to the secondary storage 506; it is assumed that the lesser amount of data to be copied results in the faster reconciliation.

In the case where copying the second data from the secondary storage 506 to the primary storage 504 is deemed quicker, then reconciliation is accomplished as has been described already: the second data is copied, and the map 510 is erased to reset the secondary storage 506 (i.e., forget the data stored on the storage 506). A new initial state is thus established. However, in the case where copying the remaining first data from the primary storage 504 to the secondary storage 506 is deemed quicker, reconciliation is performed as follows. First, the remaining first data—if any—from the primary storage 504 to the secondary storage 506 is copied. Next, the roles of the storages 504 and 506 are switched, such that the storage 506 becomes the new primary storage and the storage 504 becomes the new secondary storage. Finally, the map 510 is again erased to reset the new secondary storage (the former primary storage 504), to forgot the data stored on the new secondary storage. A new initial state is thus established; any new data to be written as sent from the host device 500 is saved on the new secondary storage (the former primary storage 504), such that the map 510 keeps track of data saved to this new secondary storage. Operation thus proceeds as has been previously described, except that the roles of the storages 504 and 506 are reversed.

It is noted that at least some aspects of the embodiment described in conjunction with FIG. 4 can operate in conjunction with other embodiments of the invention. For example, the method of FIG. 2 already described can be modified to include the updating of the secondary storage with the first data of the primary storage during free bus cycles, that the restoration accomplished in 212 can include resetting a map that keeps track of data written to the secondary storage, etc. Those of ordinary skill within the art, then, can appreciate that each of the embodiments described herein is a representative embodiment of the invention, and that at least some aspects of some embodiments can be applied to other embodiments, etc.

Computer

Figure 3:
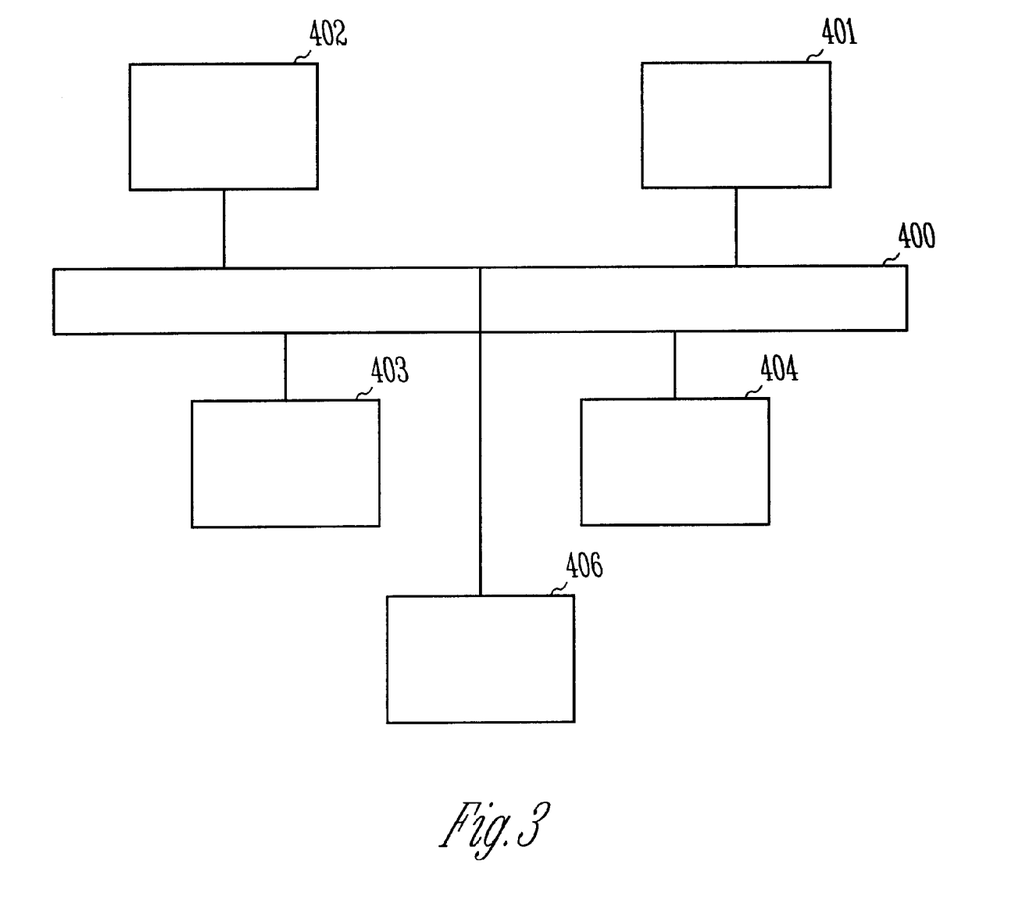
FIG. 3 shows a diagram of a computer in conjunction with which embodiments of the invention may be practiced.

Referring finally to FIG. 3, a diagram of a computer in conjunction with which embodiments of the invention may be practiced is shown. For example, the computer of FIG. 3 can function as the host device 100 of FIG. 1. The computer comprises bus 400, keyboard interface 401, external memory 402, mass storage device 403 and processor 404. Bus 400 can be a single bus or a combination of multiple buses. Bus 400 provides communication links between components in the computer, and in one embodiment functions as the connection point 102 of FIG. 1. Keyboard controller 401 can be a dedicated device or can reside in another device such as a bus controller or other controller. Keyboard controller 401 allows coupling of a keyboard to the computer system and transmits signals from a keyboard to the computer system.

External memory 402 can comprise a dynamic random access memory (DRAM) device, a static random access memory (SRAM) device, or other memory devices. External memory 402 stores information from mass storage device 403 and processor 404 for use by processor 404. Mass storage device 403 can be a hard disk drive, a floppy disk drive, a CD-ROM device, or a flash memory device—and in one embodiment, encompasses both the primary storage 104 and the secondary storage 106 of FIG. 1, as indicated by the dotted lines of the box 108 of FIG. 1. Mass storage device 404 provides information to external memory 402. Processor 404 can be a microprocessor and is capable of decoding and executing a computer program such as an application program or operating system with instructions from multiple instruction sets. Processor 404 can also be the host device 100 of FIG. 1.

Furthermore, it is shown where an embodiment of the invention can lie within the computer of FIG. 3 for example, a controller of an embodiment of the invention, such as the controller 508 of FIG. 4. This is shown by the box 406 of FIG. 3, indicating that the controller sits on the bus between the processor 404 and the mass storage device 403, to intercept commands from the former to the latter. The invention is not limited to the embodiment of FIG. 3, however.

Substantially instantaneous storage restoration has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A storage restoration device for a computer comprising:
   a connector to connect the storage device to a connection point of the computer;
   a primary storage having first data stored thereon, the primary storage to send the first data to the computer in response to a corresponding read command received at the connection point;
   a secondary storage to store second data in response to a corresponding write command including the second data received at the connection point, and to send the second data to the computer in response to a corresponding read command received at the connection point;

a controller to control the primary storage and the secondary storage, the controller including a map to track the second data received at the connection point and stored on the secondary storage; and a switch to instantly restore the secondary storage to an initial state prior to which the second data was stored thereon.

2. A storage restoration device for a computer comprising:

a connector to connect the storage device to a connection point of the computer;

a primary storage having first data stored thereon, the primary storage to send the first data to the computer in response to a corresponding read command received at the connection point;

a secondary storage to store second data in response to a corresponding write command including the second data received at the connection point, and to send the second data to the computer in response to a corresponding read command received at the connection point;

a controller to control the primary storage and the secondary storage, the controller including a map to track the second data received at the connection point and stored on the secondary storage; and a switch to establish a new initial state.

3. A storage restoration device for a computer comprising:

a connector to connect the storage device to a connection point of the computer;

a primary storage having first data stored thereon, the primary storage to send the first data to the computer in response to a corresponding read command received at the connection point;

a secondary storage to store second data in response to a corresponding write command including the second data received at the connection point, and to send the second data to the computer in response to a corresponding read command received at the connection point;

a controller to control the primary storage and the secondary storage, the controller including a map to track the second data received at the connection point and stored on the secondary storage;

a switch to instantly restore the secondary storage to an initial state prior to which the second data was stored thereon; and a switch to establish a new initial state.

4. A storage restoration system comprising:

a host device;

a connection point at the host device;

a primary storage having first data stored thereon, the primary storage to send the first data to the host device in response to a corresponding read command received at the connection point from the host device;

a secondary storage to store second data in response to a corresponding write command including the second data received at the connection point from the host device, and to send the second data to the host device in response to a corresponding read command received at the connection point from the host device;

a controller to control the primary storage and the secondary storage, the controller including a map to track the second data received at the connection point and stored on the secondary storage;

a switch to instantly restore the secondary storage to an initial state prior to which the second data was stored thereon; and a switch to establish a new initial state.

5. A computer-implemented method comprising:

in response to receiving a write command regarding a first data, storing the first data to a secondary storage;

in response to receiving a read command regarding a second data, determining whether the second data is stored on the secondary storage;

upon determining that the second data is stored on the secondary storage, reading the second data from the secondary storage;

upon determining that the second data is not stored on the secondary storage, reading the second data from a primary storage;

in response to invocation of a restore command, resetting the secondary storage to an initial state; and in response to invocation of a reconcile command, establishing a new initial state.

* * * * *